US012763225B2

(12) United States Patent
Shin et al.

(10) Patent No.: US 12,763,225 B2
(45) Date of Patent: Oct. 13, 2026

(54) SYSTEM INCLUDING EMERGENCY CORE COOLING SYSTEM VALVE FOR NUCLEAR REACTOR

(71) Applicant: KOREA ATOMIC ENERGY RESEARCH INSTITUTE, Daejeon (KR)

(72) Inventors: Soo Jai Shin, Sejong-si (KR); Cheongbong Chang, Daejeon (KR); Seungyeob Ryu, Daejeon (KR); Han-Ok Kang, Daejeon (KR); Young-In Kim, Daejeon (KR); Ji Han Chun, Daejeon (KR); Sung Won Lim, Daejeon (KR); Joo Hyung Moon, Daejeon (KR); Hun Sik Han, Sejong-si (KR); Seok Kim, Sejong-si (KR); Hyunjun Cho, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 531 days.

(21) Appl. No.: 18/278,458

(22) PCT Filed: Nov. 1, 2021

(86) PCT No.: PCT/KR2021/015539
§ 371 (c)(1),
(2) Date: Aug. 23, 2023

(87) PCT Pub. No.: WO2022/191375
PCT Pub. Date: Sep. 15, 2022

(65) Prior Publication Data
US 2024/0153655 A1 May 9, 2024

(30) Foreign Application Priority Data
Mar. 10, 2021 (KR) ........................ 10-2021-0031448

(51) Int. Cl.
*G21C 15/18* (2006.01)
*G21C 15/12* (2006.01)

(52) U.S. Cl.
CPC ............. *G21C 15/18* (2013.01); *G21C 15/12* (2013.01)

(58) Field of Classification Search
CPC ......... G21C 15/18; G21C 15/12; G21C 9/004
(Continued)

(56) References Cited

U.S. PATENT DOCUMENTS 4,363,780 A * 12/1982 Hannerz ................ G21C 15/18 376/282
10,529,458 B2 * 1/2020 Kanuch .................. G21C 15/18
(Continued)

FOREIGN PATENT DOCUMENTS

JP H0798391 4/1995
JP 2020-098600 6/2020
(Continued)

OTHER PUBLICATIONS

KIPO, Search Report & Written Opinion of PCT/KR2021/015539 dated Feb. 8, 2022.

*Primary Examiner* — Jack W Keith
*Assistant Examiner* — Daniel Wasil
(74) *Attorney, Agent, or Firm* — LEX IP MEISTER, PLLC

(57) ABSTRACT

A system comprising an emergency core cooling system (ECCS) valve, a nuclear reactor vessel, and a containment vessel surrounding the nuclear reactor vessel, is provided. The ECCS valve comprises an outer shell connected to the nuclear reactor vessel and protruding toward the containment vessel and having a connector formed therein; an inner shell provided inside the outer shell at a preset distance from an inner wall of the outer shell; a piston movably constrained
(Continued)

and inserted through a piston opening formed in the inner shell at a position facing the connector of the outer shell to open and close the connector; a spring provided on an outer circumferential surface of the piston to provide a restoring force for moving the piston in a direction toward the nuclear reactor vessel; a fluid pump; a swing check valve; a reset valve; and a trip valve.

9 Claims, 22 Drawing Sheets

(58) Field of Classification Search
USPC .......................................................... 376/282
See application file for complete search history.

(56) References Cited

U.S. PATENT DOCUMENTS

| | | | | |
|---|---|---|---|---|
| 2019/0362861 | A1 | 11/2019 | O'Brien et al. | |
| 2020/0194135 | A1 * | 6/2020 | Shearer | G21C 15/18 |

FOREIGN PATENT DOCUMENTS

| | | |
|---|---|---|
| KR | 10-0446134 | 8/2004 |
| KR | 10-2008-0106454 | 12/2008 |
| KR | 10-2010-0045242 | 5/2010 |
| KR | 10-2013-0104336 | 9/2013 |
| KR | 10-1364646 | 2/2014 |
| KR | 10-1522223 | 5/2015 |
| KR | 10-1543261 | 8/2015 |
| KR | 10-2020-0073163 | 6/2020 |
| WO | 2019-059541 | 3/2019 |

* cited by examiner

【Figure 1】
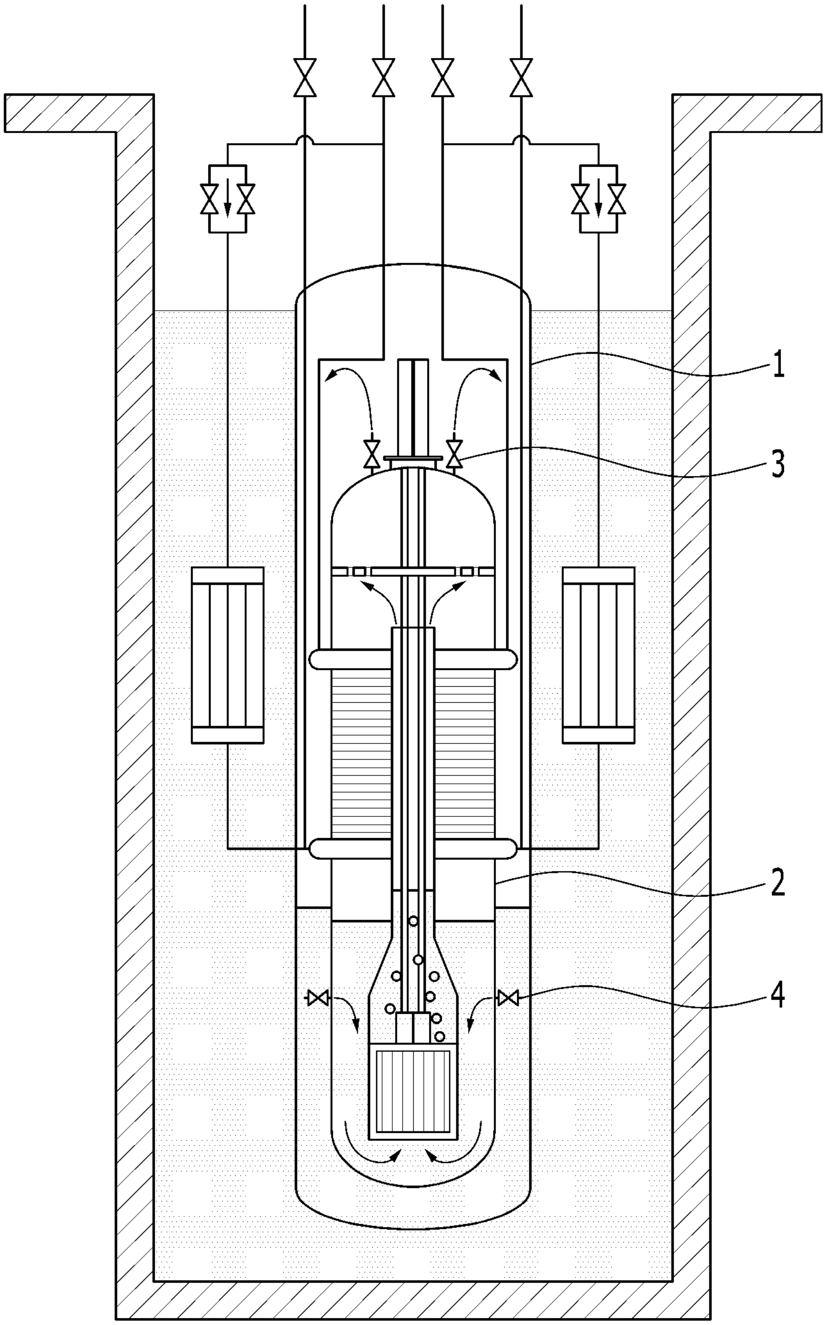

【Figure 2】
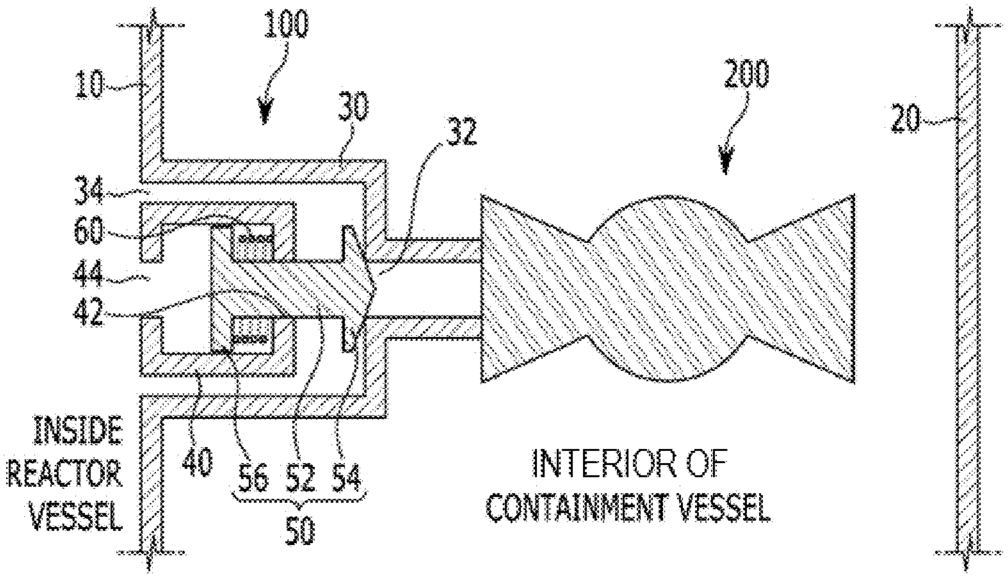

【Figure 3】
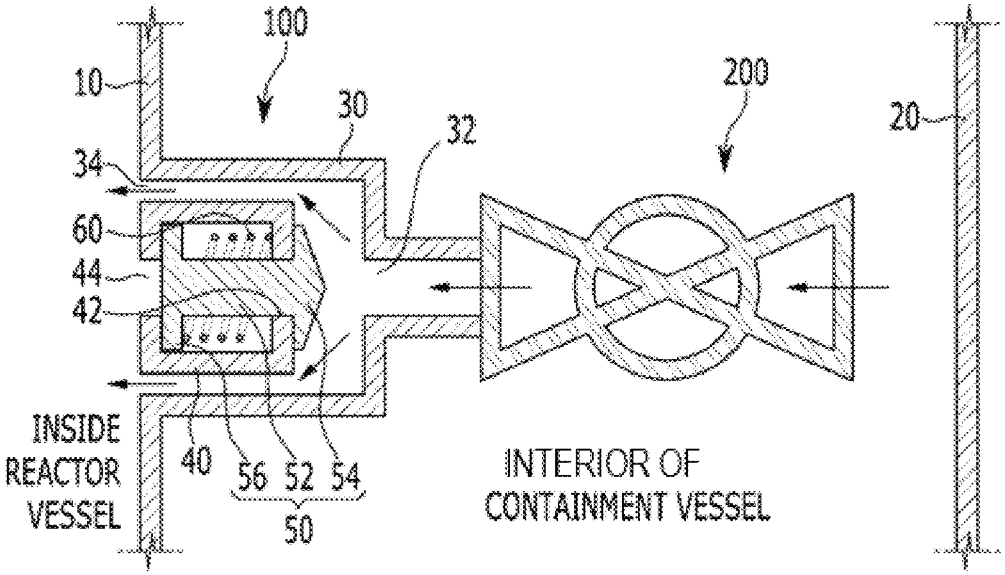

【Figure 4A】
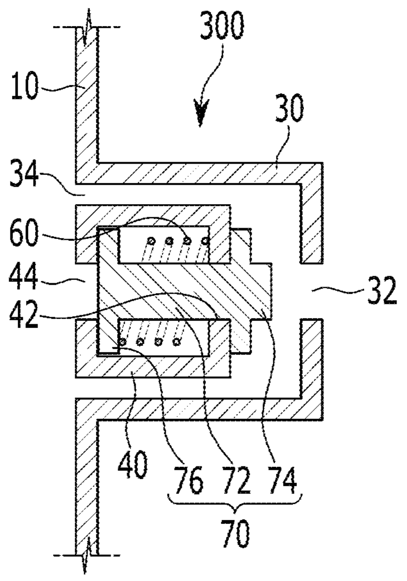

【Figure 4B】
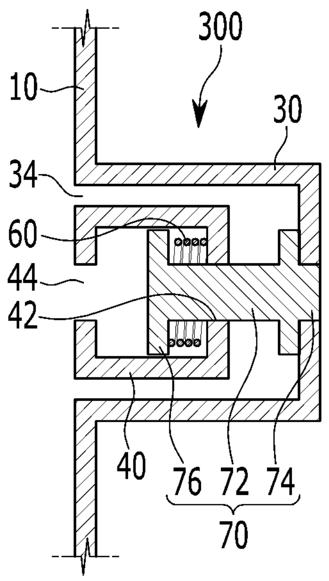

【Figure 5A】
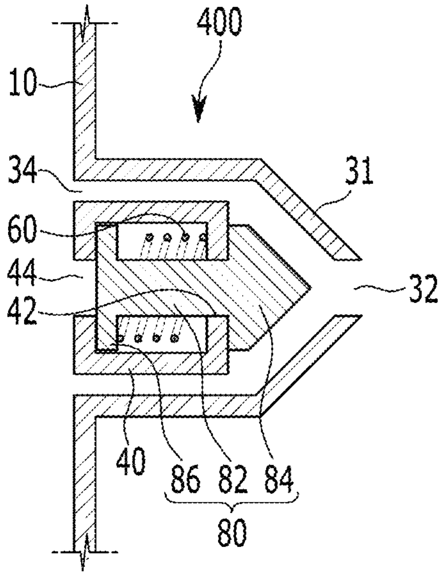

【Figure 5B】
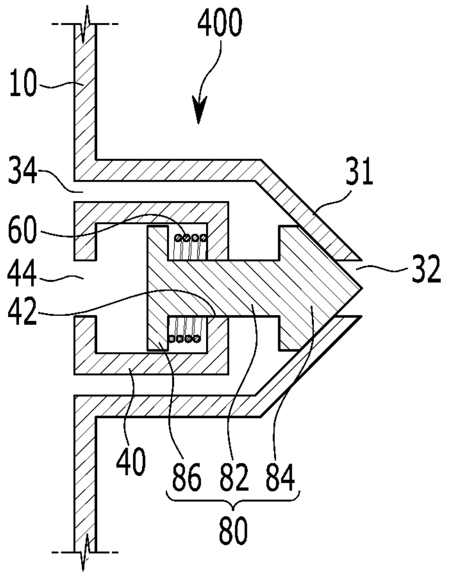

【Figure 6A】
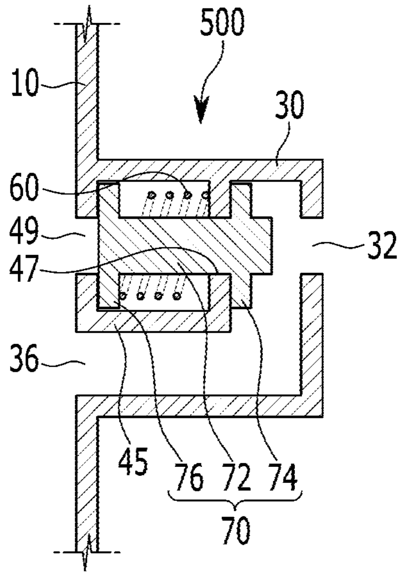

【Figure 6B】
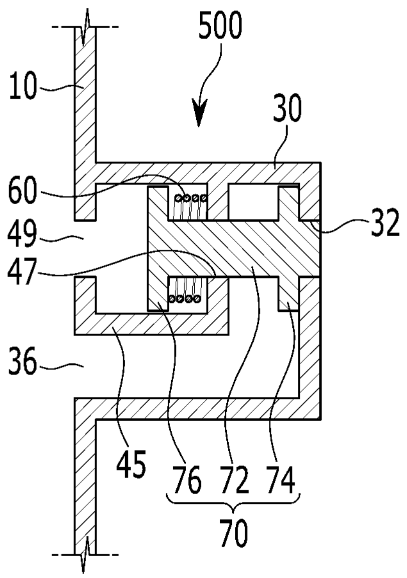

【Figure 7A】
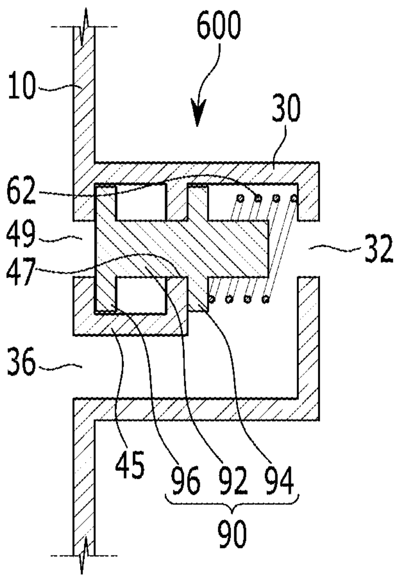

【Figure 7B】
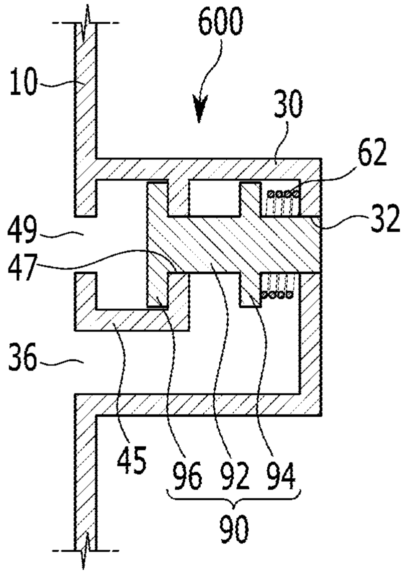

【Figure 8A】
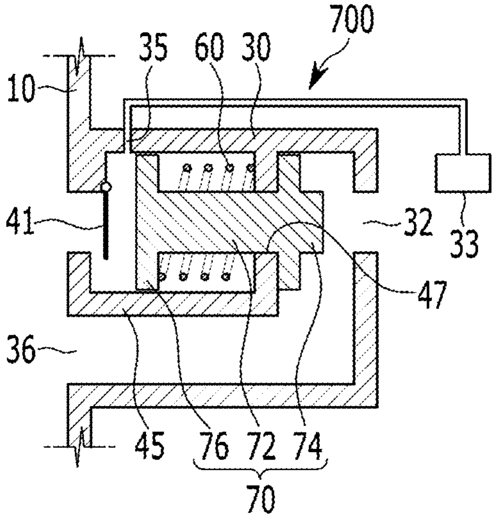

【Figure 8B】
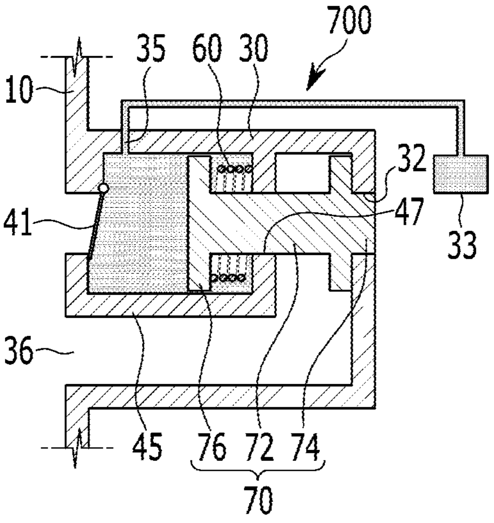

【Figure 8C】
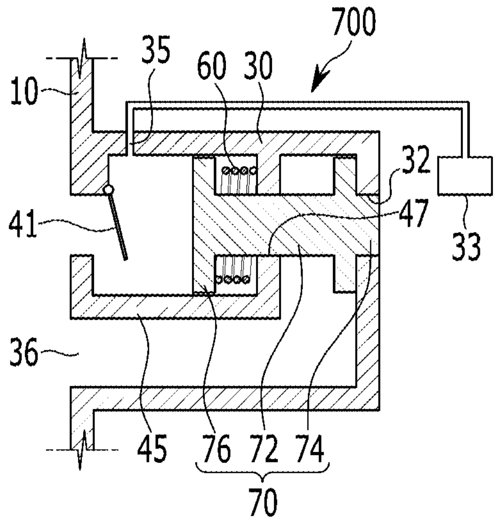

【Figure 8D】
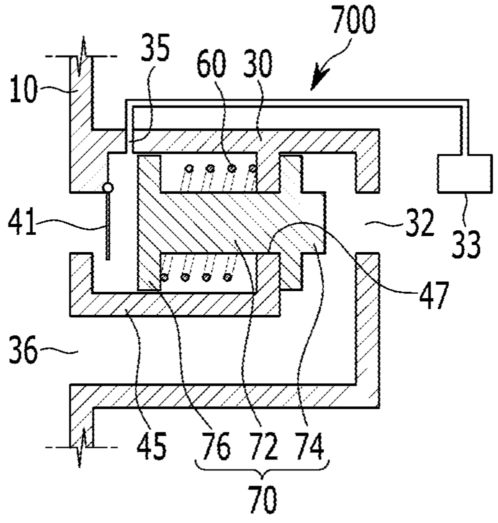

【Figure 9A】
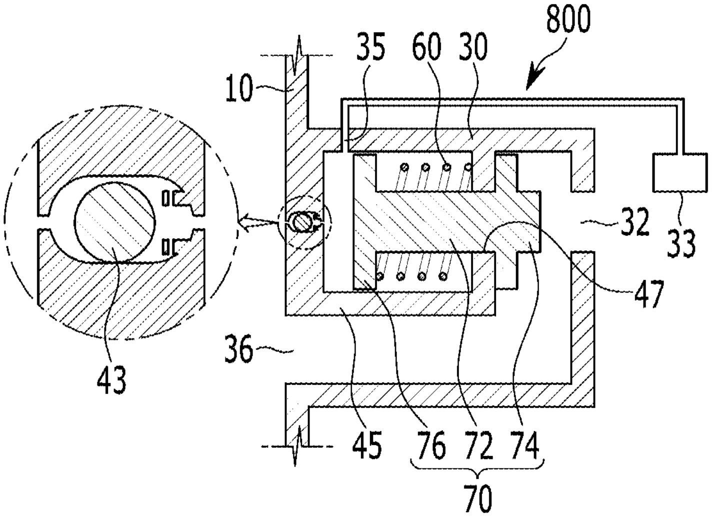

【Figure 9B】
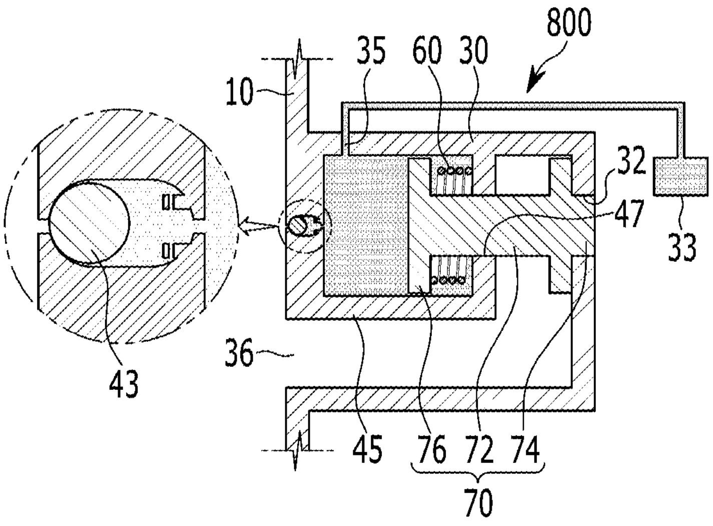

【Figure 9C】
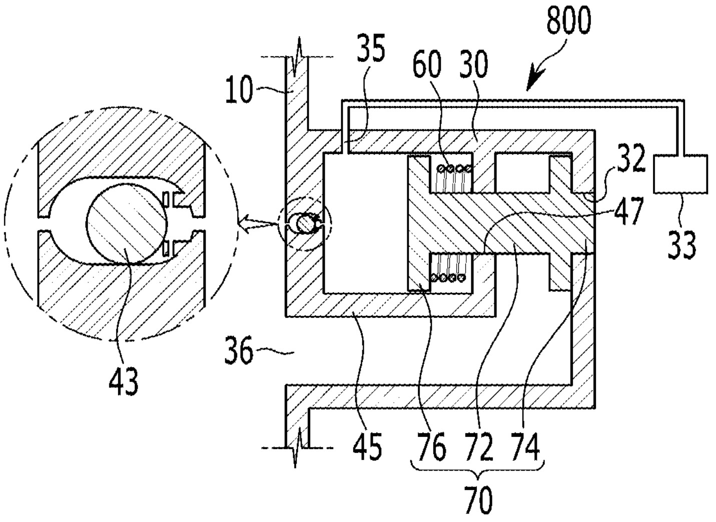

【Figure 9D】
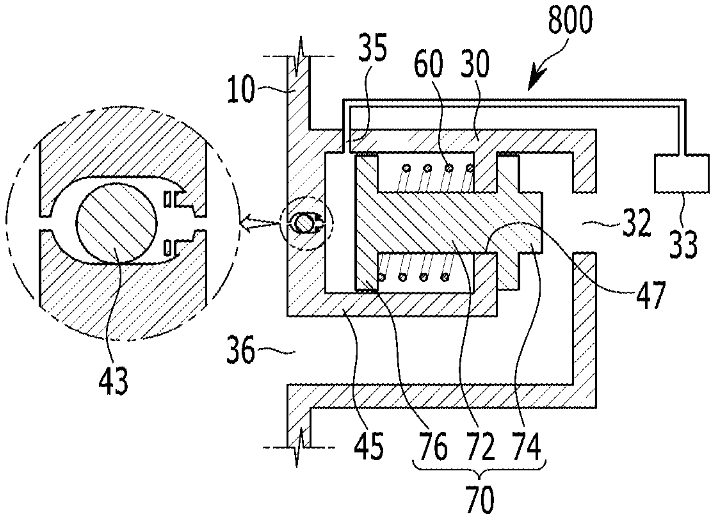

【Figure 10】
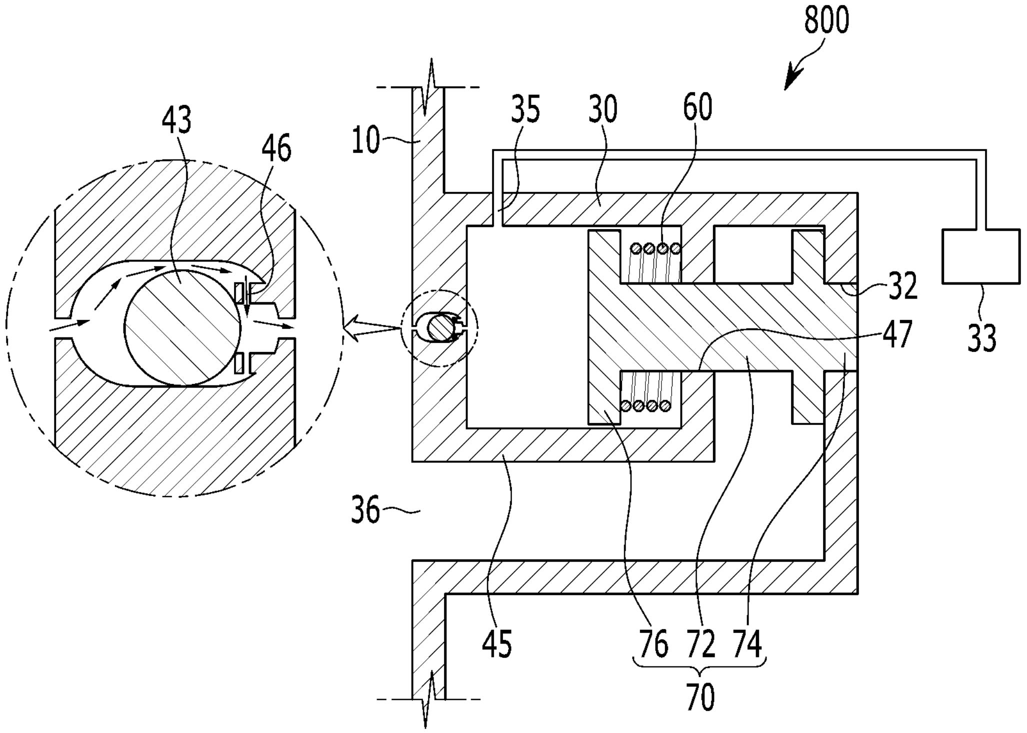

【Figure 11A】
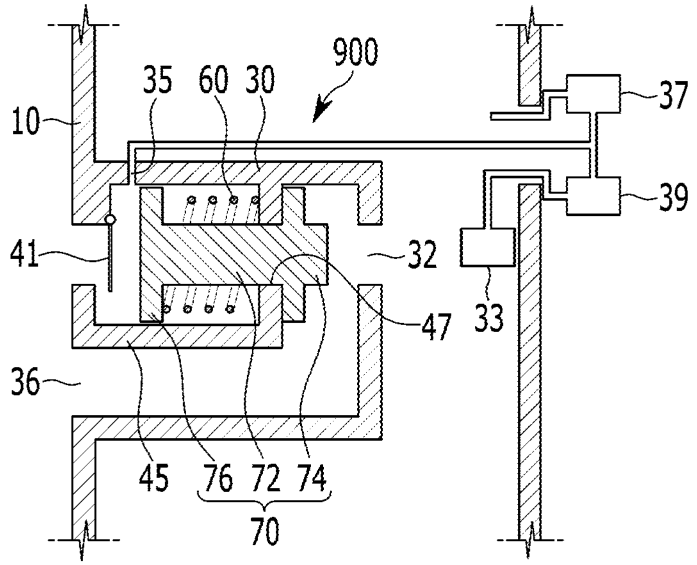

【Figure 11B】
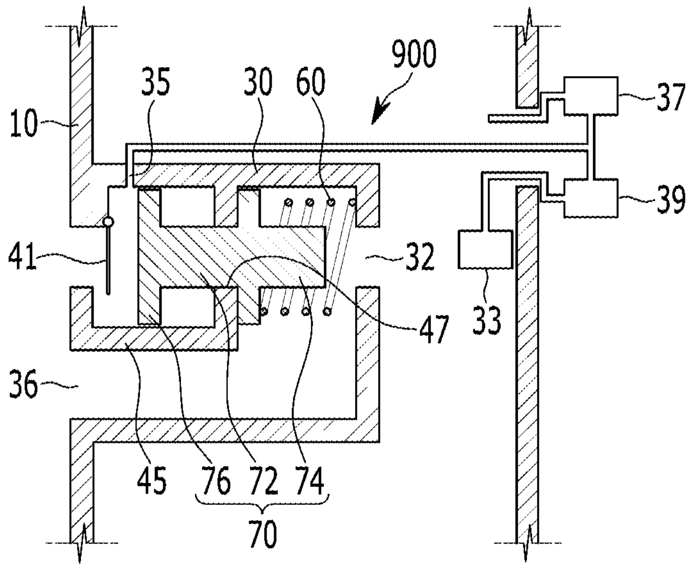

SYSTEM INCLUDING EMERGENCY CORE COOLING SYSTEM VALVE FOR NUCLEAR REACTOR

TECHNICAL FIELD

The present invention relates to an emergency core cooling system (ECCS) valve of a system-integrated modular advanced reactor (SMART), and more particularly to, an ECCS valve of a SMART that is automatically opened and closed by the size relationship between a pressure difference around the valve and a spring restoring force.

BACKGROUND ART

An integrated reactor (system-integrated modular advanced reactor (SMART), NuScale, etc.) has major devices (e.g., a steam generator, a pressurizer, a pump, etc.) embedded into a reactor vessel (RV), and thus, has no large pipe to connect these major devices. In addition, unlike a commercial pressurized water reactor, a pipe of the integrated reactor connected to the RV is small, and is mostly positioned on an upper portion of the reactor. Therefore, when a loss of coolant accident (LOCA) occurs due to a pipe break in the integrated reactor, because a pressure and a water level of the reactor gradually decrease, the system-integrated reactor has a characteristic that it is difficult to inject a coolant into the reactor by using natural forces such as gravity due to the high pressure of the reactor.

Accordingly, in the case of an accident in a NuScale reactor, as shown in FIG. 1 for long-term passive cooling of a core, a reactor discharge valve 3 and a reactor recirculation valve 4 of a RV 2 are opened. The NuScale reactor employs a small containment vessel 1, and increases the back pressure of the small containment vessel 1 to suppress a break flow rate. Due to the opening of the reactor discharge valve 3, steam in the reactor is discharged into the small containment vessel 1 to reduce the internal pressure of the reactor, and on the contrary, the pressure of the small containment vessel 1 rises to balance at a pressure.

From the viewpoint of natural circulation cooling, steam boiling by a reactor core is discharged through the reactor discharge valve 3 and a break portion, and the discharged steam is condensed on an inner wall of the small containment vessel 1 by an external water tank containing water of a low temperature. This condensate naturally descends by gravity and is collected in a lower portion of the small containment vessel 1, and is injected into the core again through the reactor recirculation valve 4 by a water head difference between the inside of the small containment vessel 1 and the inside of the RV 2 and a back pressure. As described above, the reactor coolant naturally circulates in the order of core boiling, steam discharge through the reactor discharge valve 3, condensation of the inner wall of the small containment vessel 1, and cooling water injection through the reactor recirculation valve 4 to cool the core in the long term.

However, the reactor recirculation valve 4 has a very complex configuration and is not easy to manufacture and implement. In addition, the reactor recirculation valve 4 is opened and closed by a pressure signal of the reactor and a pressure signal of the small containment vessel 1. During a normal operation, when the pressure of the reactor is greater than the pressure of the small containment vessel 1, the reactor recirculation valve 4 must be closed. However, a case in which the reactor recirculation valve 4 malfunctions and opens during the normal operation due to abnormal detection of the pressure signal may occur.

As related prior documents, Korean Patent Publication No. 2013-0104336 discloses "passive core cooling system", Korean Patent Registration No. 1364646 discloses "passive safety system using small safe guard vessel and integral reactor having the same", and Korean Patent Registration No. 0446134 discloses "passively opening and closing device for offering bypass flow for natural circulation operation of integral reactor SMART".

PRIOR ART DOCUMENTS

Patent Documents (Patent Document 1) Korean Patent Publication No. 2013-0104336

(Patent Document 2) Korean Patent Registration No. 1364646

(Patent Document 3) Korean Patent Registration No. 0446134

DISCLOSURE

Technical Problem

The present disclosure attempts to provide an emergency core cooling system (ECCS) valve of a system-integrated modular advanced reactor (SMART) capable of being automatically opened and closed by the size relationship between a pressure difference around the valve and a spring restoring force, and implementing a malfunction prevention valve function by using the existing isolation valve together.

Technical Solution

According to an embodiment of the present invention, an emergency core cooling system (ECCS) valve provided between a reactor vessel of a system-integrated modular advanced reactor (SMART) and a small containment vessel formed to surround the reactor vessel so that a coolant is filled in a space between the reactor vessel and the small containment vessel in the event of a loss of coolant accident (LOCA) includes an outer shell connected to the reactor vessel and formed to protrude toward the small containment vessel and having a connector formed therein so as to communicatively connect an inside of the reactor vessel to an inside of the small containment vessel, an inner shell provided inside the outer shell at a preset distance from an inner wall of the outer shell, a piston movably constrained and inserted through a piston opening formed in the inner shell at a position facing the connector of the outer shell to open and close the connector, and a spring provided on an outer circumferential surface of the piston to provide a restoring force for moving the piston to a side of the reactor vessel, wherein the piston operates to open the connector when a difference between an internal pressure of the reactor vessel and an internal pressure of the small containment vessel is less than the restoring force of the spring.

Advantageous Effects

An embodiment of the present invention may easily implement an ECCS valve function by using a simple valve for preventing malfunction and the existing isolation valve (fail-open).

In addition, an embodiment of the present invention may greatly reduce a possibility of exposure of a core by preventing malfunction of the ECCS valve in the event of a reactor accident.

In addition, an embodiment of the present invention may reduce a safety level of a reactor vessel by configuring the ECCS valve and the existing isolation valve, thereby designing the reduced safety level of a small containment vessel according to the design characteristics of the reactor.

DESCRIPTION OF THE DRAWINGS

FIG. 1 is a diagram schematically showing a system-integrated modular advanced reactor (SMART) including an emergency core cooling system (ECCS) valve according to an embodiment of the present invention.

FIG. 2 is a diagram schematically showing a state in which the ECCS valve is closed according to an embodiment of the present invention.

FIG. 3 is a diagram schematically showing a state in which an ECCS valve is opened according to an embodiment of the present invention.

FIG. 4 is a diagram schematically showing a state in which an ECCS valve is opened and closed according to another embodiment of the present invention.

FIG. 5 is a diagram schematically showing a state in which an ECCS valve is opened and closed according to another embodiment of the present invention.

FIG. 6 is a diagram schematically showing a state in which an ECCS valve is opened and closed according to another embodiment of the present invention.

FIG. 7 is a diagram schematically showing a state in which an ECCS valve is opened and closed according to another embodiment of the present invention.

FIG. 8 is a view schematically showing a structure of an ECCS valve including a swing check valve to facilitate initial closing of the ECCS valve according to an embodiment of the present invention.

FIG. 9 is a view schematically showing a structure of an ECCS valve including a ball valve to facilitate initial closing of the ECCS valve according to another embodiment of the present invention.

FIG. 10 is an enlarged view of the ball valve shown in FIG. 9.

FIG. 11 is a view showing a structure including a reset valve and a trip valve in the structure of the ECCS valve shown in FIG. 8.

MODE FOR INVENTION

The present invention will be described more fully hereinafter with reference to the accompanying drawings, so that those skilled in the art to which the present invention pertains may easily implement the embodiment of the present invention. The present invention may be implemented in many different forms and is not limited to the embodiments described herein. In order to clearly describe the present invention, parts irrelevant to the description are omitted from the drawings, and the same reference numerals are denoted by the same or similar components throughout the specification. In addition, in the case of well-known technologies, detailed descriptions thereof are omitted.

In addition, throughout the specification, when a portion "includes" a certain component, it means that the portion may further include other components without excluding other components unless otherwise stated.

An emergency core cooling system (ECCS) valve according to an embodiment of the present invention is described below.

FIG. 2 is a diagram schematically showing a state in which an ECCS valve is closed according to an embodiment of the present invention. FIG. 3 is a diagram schematically showing a state in which the ECCS valve is opened according to an embodiment of the present invention.

Referring to FIGS. 2 and 3, an ECCS valve 100 according to an embodiment of the present invention is provided between a reactor vessel 10 of a system-integrated modular advanced reactor (SMART) and a small containment vessel 20 formed to surround the reactor vessel 10. In the event of a loss of coolant accident (LOCA), a coolant is filled in a space between the reactor vessel 10 and the small containment vessel 20, and the ECCS valve 100 is opened together with an existing isolation valve 200 so that the coolant may be injected into the reactor vessel 10.

The ECCS valve 100 may include an outer shell 30, an inner shell 40, a piston 50, and a spring 60.

The outer shell 30 may be connected to the reactor vessel 10 and may protrude toward the small containment vessel 20. A connector 32 may be formed in the outer shell 30 so as to communicatively connect the inside of the reactor vessel 10 to the inside of the small containment vessel 20 toward the side of the small containment vessel 20, and an outer shell opening 34 may be formed toward the opposite side of the connector 32, that is, the side of the reactor vessel 10 of the outer shell 30. Accordingly, when the ECCS valve 100 and the isolation valve 200 are opened, the coolant may be introduced into the reactor vessel 10 from the inside of the small containment vessel 20.

The inner shell 40 may be provided inside the outer shell 30 at a preset distance from the inner wall of the outer shell 30. An inner wall of one side of the inner shell 40 may be connected to the reactor vessel 10. An inner shell opening 44 may be formed in the inner shell 40 toward the side of the reactor vessel 10. In addition, a piston opening 42 may be formed in the inner shell 40 toward the side of the small containment vessel 20. The piston 50 may be movably inserted into the piston opening 42.

The piston 50 is movably constrained and inserted through the piston opening 42 at a position facing the connector 32 of the outer shell 30 to open and close the connector 32.

The piston 50 may include a body portion 52, a head portion 54, and a bottom portion 56. The body portion 52 may be inserted into the piston opening 42, and the head portion 54 may be integrally formed with the body portion 52 on one side of the body portion 52 facing the side of the small containment vessel 20, may be positioned on the outside of the inner shell 40, and may contact the connector 32 by a movement of the piston 50. The bottom portion 56 is integrally formed with the body portion 52 on the other side of the body portion 52 facing the side of the reactor vessel 10, and is positioned inside the inner shell 40.

The head portion 54 of the piston 50 may include an inclined surface inclined toward the connector 32 on a cross section, and the inclined surface may contact an edge of the connector 32 so that the head portion 54 may seal the connector 32.

The spring 60 is provided to surround an outer circumferential surface of the body portion 52 of the piston 50, and is interposed between the bottom portion 56 and an inner wall of the inner shell 40 on the side of the small containment vessel 20. The spring 60 may provide a restoring force to allow the piston 50 to move toward the reactor vessel 10.

Meanwhile, the body portion 52 of a part where the outer circumferential surface of the body portion 52 of the piston 50 and the piston opening 42 contact each other, and the bottom portion 56 of a part where the bottom portion 56 and the inner shell opening 42 contact each other may be coated with a material such as rubber for tight sealing.

During a normal operation, the internal pressure of the reactor vessel 10 is high and the internal pressure of the small containment vessel 20 is low, and thus, the ECCS valve 100 is in a closed state. As shown in FIG. 2, the internal pressure of the reactor vessel 10 acts on the bottom portion 56 through the inner shell opening 44, and the piston 50 moves to the side of the small containment vessel 20 so that the head portion 54 contacts the edge of the connector 32 and the connector 32 is sealed. At this time, since a difference between the internal pressure of the reactor vessel 10 and the internal pressure of the small containment vessel 20 is greater than a restoring force of the spring 60, the spring 60 is in a compressed state between the bottom portion 56 and the inner wall of the inner shell 40.

In an emergency state such as the LOCA, the reactor release valve (‘3’ in FIG. 1) of the reactor vessel 10 and the isolation valve 200 are opened. Steam in the reactor vessel 10 is discharged into the small containment vessel 20 by opening of the reactor release valve 3 so that the internal pressure of the reactor decreases and the internal pressure of the small containment vessel 20 increases. When the difference between the internal pressure of the reactor vessel 10 and the internal pressure of the small containment vessel 20 is less than the restoring force of the spring 60, the ECCS valve 100 is opened, and water collected in a lower portion of the small containment vessel 20 is injected into the reactor through the connector 32 and the outer shell opening 34. That is, as the internal pressure of the small containment vessel 20 increases, the pressure acts on the head portion 54 through the connector 32, and the piston 50 moves to the inside of the reactor vessel 10 so that the head portion 54 is separated from the edge of the connector 32 and the connector 32 is opened. At this time, since a difference between the internal pressure of the reactor vessel 10 and the internal pressure of the small containment vessel 20 is less than the restoring force of the spring 60, the spring 60 is in a relaxed state.

On the other hand, the restoring force of the spring 60 described through FIGS. 2 and 3 may be determined by the design characteristics of the reactor, and may be set to a value between about 0 and about 15 MPa.

FIG. 4 is a diagram schematically showing a state in which an ECCS valve is opened and closed according to another embodiment of the present invention.

Referring to FIG. 4, an ECCS valve 300 according to an embodiment of the present invention may include the outer shell 30, the inner shell 40, a piston 70, and the spring 60.

Structures of the outer shell 30, the inner shell 40, and the spring 60 are the same as those described with reference to FIGS. 2 and 3, and thus, redundant descriptions thereof are omitted below.

The piston 70 may include a body portion 72, a head portion 74, and a bottom portion 76. The body portion 72 may be inserted into the piston opening 42, and the head portion 74 may be integrally formed with the body portion 72 on one side of the body portion 72 facing the side of the small containment vessel 20, may be positioned on the outside of the inner shell 40, and may contact the connector 32 by a movement of the piston 70. The bottom portion 76 is integrally formed with the body portion 72 on the other side of the body portion 72 facing the side of the reactor vessel 10, and is positioned inside the inner shell 40.

The head portion 74 of the piston 70 may include a stepped surface stepped toward the connector 32 on a cross section, and the stepped surface may contact an edge of the connector 32 so that the head portion 74 may seal the connector 32.

In an emergency, as shown in FIG. 4A, when a difference between the internal pressure of the reactor vessel 10 and the internal pressure of the small containment vessel 20 is less than a restoring force of the spring 60, the piston 70 moves to the inside of the reactor vessel 10 so that the head portion 74 is separated from an edge of the connector 32 and the connector 32 is opened. Then, water collected in a lower portion of the small containment vessel 20 is injected into the reactor through the connector 32 and the outer shell opening 34.

In addition, during a normal operation, as shown in FIG. 4B, since the difference between the internal pressure of the reactor vessel 10 and internal pressure of the small containment vessel 20 is greater than the restoring force of the spring 60, the piston 70 moves to the side of the small containment vessel 20 so that the head portion 74 contacts the edge of the connector 32 and the connector 32 is sealed.

FIG. 5 is a diagram schematically showing a state in which an ECCS valve is opened and closed according to another embodiment of the present invention.

Referring to FIG. 5, an ECCS valve 400 according to an embodiment of the present invention may include an outer shell 31, the inner shell 40, a piston 80, and the spring 60.

Structures of the inner shell 40 and the spring 60 are the same as those described with reference to FIGS. 2 and 3, and thus, redundant descriptions thereof are omitted below.

The piston 80 may include a body portion 82, a head portion 84, and a bottom portion 86. The body portion 82 may be inserted into the piston opening 32, and the head portion 84 may be integrally formed with the body portion 82 on one side of the body portion 82 facing the side of the small containment vessel 20, may be positioned on the outside of the inner shell 40, and may contact the connector 32 by a movement of the piston 80. The head portion 84 has a surface inclined toward the side of the small containment vessel 20. The bottom portion 86 is integrally formed with the body portion 82 on the other side of the body portion 82 facing the side of the reactor vessel 10, and is positioned inside the inner shell 40.

The outer shell 31 may be formed to protrude toward the small containment vessel 20 in a form corresponding to the inclined surface of the head portion 84 of the piston 80.

In an emergency, as shown in FIG. 5A, when a difference between the internal pressure of the reactor vessel 10 and internal pressure of the small containment vessel 20 is less than a restoring force of the spring 60, the piston 80 moves to the inside of the reactor vessel 10 so that the head portion 84 is separated from an inclined inner surface of the outer shell 31 and the connector 32 is opened. Then, water collected in a lower portion of the small containment vessel 20 is injected into the reactor through the connector 32 and the outer shell opening 34.

In addition, during a normal operation, as shown in FIG. 5B, since the difference between the internal pressure of the reactor vessel 10 and internal pressure of the small containment vessel 20 is greater than the restoring force of the spring 60, the piston 80 moves to the side of the small containment vessel 20 so that the head portion 84 contacts the inclined inner surface of the outer shell 31 and the connector 32 is sealed.

FIG. 6 is a diagram schematically showing a state in which an ECCS valve is opened and closed according to another embodiment of the present invention.

Referring to FIG. 6, an ECCS valve 500 according to an embodiment of the present invention may include the outer shell 30, an inner shell 45, the piston 70, and the spring 60.

Structures of the outer shell 30, the spring 60, and the piston 70 are the same as those described with reference to FIG. 4, and thus, redundant descriptions thereof are omitted below.

The inner shell 45 may be formed to share an inner wall with an inner wall on one side of the outer shell 30.

In an emergency, as shown in FIG. 6A, when a difference between the internal pressure of the reactor vessel 10 and the internal pressure of the small containment vessel 20 is less than a restoring force of the spring 60, the piston 70 moves to the inside of the reactor vessel 10 so that the head portion 74 is separated from an edge of the connector 32 and the connector 32 is opened. Then, water collected in a lower portion of the small containment vessel 20 is injected into the reactor through the connector 32 and an outer shell opening 36.

In addition, during a normal operation, as shown in FIG. 6B, since the difference between the internal pressure of the reactor vessel 10 and internal pressure of the small containment vessel 20 is greater than the restoring force of the spring 60, the piston 70 moves to the side of the small containment vessel 20 so that the head portion 74 contacts the edge of the connector 32 and the connector 32 is sealed.

FIG. 7 is a diagram schematically showing a state in which an ECCS valve is opened and closed according to another embodiment of the present invention.

Referring to FIG. 7, an ECCS valve 600 according to an embodiment of the present invention may include the outer shell 30, an inner shell 45, a piston 90, and a spring 62.

Structures of the outer shell 30 and the inner shell 45 are the same as those described with reference to FIG. 6, and thus, redundant descriptions thereof are omitted below.

The spring 62 may be interposed between a stepped surface of a head portion 94 and an inner wall of the outer shell 30. To this end, the head portion 94 of the piston 90 may be formed to have a length longer than the head portion 74 of the piston 70 shown in FIGS. 4 and 6.

In an emergency, as shown in FIG. 7A, when a difference between the internal pressure of the reactor vessel 10 and the internal pressure of the small containment vessel 20 is less than a restoring force of the spring 62, the piston 90 moves to the inside of the reactor vessel 10 so that the head portion 94 is separated from an edge of the connector 32 and the connector 32 is opened. Then, water collected in a lower portion of the small containment vessel 20 is injected into the reactor through the connector 32 and the outer shell opening 36.

In addition, during a normal operation, as shown in FIG. 7B, since the difference between the internal pressure of the reactor vessel 10 and internal pressure of the small containment vessel 20 is greater than the restoring force of the spring 62, the piston 90 moves to the side of the small containment vessel 20 so that the head portion 94 contacts the edge of the connector 32 and the connector 32 is sealed.

FIG. 8 is a view schematically showing a structure of an ECCS valve including a swing check valve to facilitate initial closing of the ECCS valve according to an embodiment of the present invention.

Referring to FIG. 8, a structure of an ECCS valve 700 is the same as that described with reference to FIG. 6 except for the structure further including a swing check valve 41 and a fluid pump 33, and thus, a redundant description thereof is omitted below.

Referring to FIG. 8, the ECCS valve 700 according to an embodiment of the present invention may further include the fluid pump 33 supplying fluid into the inner shell 45 between the reactor vessel 10 and the bottom portion 76 of the piston 70. The fluid pump 33 may be connected by a pipe to a fluid supply source such as a fluid tank. In addition, the ECCS valve 700 according to the embodiment of the present invention may further include the swing check valve 41 provided to pivotally hinge on an inner wall of the inner shell 45 on the side of the reactor vessel 10 and opening and closing the inner shell opening 49 between the reactor vessel 10 and the inner shell 45 according to the internal pressure of the reactor vessel 10 and the fluid pressure supplied from the fluid pump 33 into the inner shell 45.

The fluid pump 33 and the swing check valve 41 are provided to facilitate initial closing of the ECCS valve 700. That is, when a fluid flows into the inner shell 45 in a state (FIG. 8A) in which the swing check valve 41 is opened with the internal pressure of the reactor vessel 10 and the internal pressure of the inner shell 45 which are initially the same, the swing check valve 41 pivotally hinges by the flow of the fluid, and when the pressure is high, the swing check valve 41 is firmly closed. In addition, as the internal pressure of the inner shell 45 gradually increases by the pressure of the injected fluid, the piston 70 of the ECCS valve 700 moves to the side of the small containment vessel 20, and the ECCS valve 700 is closed (FIG. B).

When the internal pressure of a reactor increases while the reactor starts, the internal pressure of the reactor vessel 10 is higher than the internal pressure of the inner shell 45, the swing check valve 41 is naturally opened, and over time, the internal pressure of the inner shell 45 and the internal pressure of the reactor vessel 10 are balanced (FIG. 8C).

When an accident occurs, when the internal pressure of the reactor vessel 10 decreases and a difference between the internal pressure of the reactor vessel 10 and the internal pressure of the small containment vessel 20 is less than a restoring force of the spring 60, the ECCS valve 700 is opened (FIG. 8D).

FIG. 9 is a view schematically showing a structure of an ECCS valve including a ball valve to facilitate initial closing of the ECCS valve according to another embodiment of the present invention.

Referring to FIG. 9, an ECCS valve 800 according to an embodiment of the present invention may further include the fluid pump 33 supplying fluid into the inner shell 45 between the reactor vessel 10 and the bottom portion 76 of the piston 70.

In addition, the ECCS valve 800 according to the embodiment of the present invention may further include a ball valve 43 provided inside an inner wall of the inner shell 45 on the side of the reactor vessel 10 and communicatively connecting or disconnecting the reactor vessel 10 to or from the inside of the inner shell 45 by moving according to the internal pressure of the reactor vessel 10 and the fluid pressure supplied from the fluid pump 33 into the inner shell 45.

Similarly to the fluid pump 33 and the swing check valve 41 described with reference to FIG. 8, the fluid pump 33 and the ball valve 43 shown in FIG. 9 are also provided to facilitate initial closing of the ECCS valve 800.

When a fluid flows into the inner shell 45 in a state (FIG. 9A) in which the ball valve 43 is opened with the internal pressure of the reactor vessel 10 and the internal pressure of the inner shell 45 which are initially the same, the ball valve 43 moves to the inside of the reactor vessel 10 by the flow of the fluid, and when the pressure is high, the ball valve 43 completely moves to and comes into close contact with the inside of the reactor vessel 10. In addition, as the internal pressure of the inner shell 45 gradually increases by the pressure of the injected fluid, the piston 70 of the ECCS valve 800 moves to the side of the small containment vessel 20, and the ECCS valve 800 is closed (FIG. 9B).

When the internal pressure of a reactor increases while the reactor starts, the internal pressure of the reactor vessel 10 is higher than the internal pressure of the inner shell 45, the ball valve 43 naturally moves to the inside of the inner shell 45, and over time, the internal pressure of the inner shell 45 and the internal pressure of the reactor vessel 10 are balanced (FIG. 9C).

When an accident occurs, when the internal pressure of the reactor vessel 10 decreases and a difference between the internal pressure of the reactor vessel 10 and the internal pressure of the small containment vessel 20 is less than a restoring force of the spring 60, the ECCS valve 800 is opened (FIG. 9D).

FIG. 10 is an enlarged view of the ball valve 43 shown in FIG. 9.

Referring to FIG. 10, a fluid opening 46 bypassing the ball valve 43 when the ball valve 43 moves to and contacts the side of the inner shell 45 and maintaining the flow of fluid between the inside of the reactor vessel 10 and the inside of the inner shell 45 is formed inside an inner wall of the inner shell 45. This is to ensure that the fluid always flows so that the internal pressure of the inner shell 45 and the internal pressure of the reactor vessel 10 are balanced over time as the internal pressure of a reactor increases while the reactor starts.

FIG. 11 is a view showing a structure including a reset valve and a trip valve in the structure of the ECCS valve shown in FIG. 8.

Referring to FIG. 11A, a structure of an ECCS valve 900 is the same as the ECCS valve 700 described with reference to FIG. 8 except for the structure further including a reset valve 39 and a trip valve 37, and thus, a redundant description thereof is omitted below.

Referring to FIG. 11A, the ECCS valve 900 according to an embodiment of the present invention may further include the reset valve 39 connected to the fluid pump 33 and supplying, by opening, fluid from the fluid pump 33 to the inside of the inner shell 45 between the reactor vessel 10 and the bottom portion 76 of the piston 70, and the trip valve 37 opened during malfunction of the reset valve 39 or by an operating signal and operating to reduce the internal pressure of the inner shell 45.

The reset valve 39 is normally closed, and is opened for initial closing of the ECCS valve 900 so that fluid is injected from the fluid pump 33 into the inner shell 45. When the ECCS valve 900 is closed and the internal pressure of the reactor vessel 10 is higher than the pressure of an inner space of the inner shell 45, the reset valve 39 is closed.

When the reset valve 39 is opened due to malfunction, the fluid is continuously introduced into the inner shell 45, and, even if the internal pressure of the reactor vessel 10 decreases, a situation in which the ECCS valve 900 is not opened may occur. In this case, the internal pressure of the inner shell 45 may be reduced by opening the trip valve 37 so that the ECCS valve 900 may be opened. The trip valve 37 may be opened by the operation signal.

The reset valve 39 and the trip valve 37 may be employed even in the embodiments shown in FIGS. 8 and 9 so that closing of the ECCS valve 900 may be facilitated. In addition, when the spring 60 is provided on an outer circumferential surface of the head portion 72 of the piston 70, the reset valve 39 and the trip valve 37 may be employed in the same way (FIG. 11B).

As described above, an embodiment of the present invention may easily implement an ECCS valve function by using a simple valve for preventing malfunction and the existing isolation valve (fail-open).

In addition, an embodiment of the present invention may greatly reduce a possibility of exposure of a core by preventing malfunction of the ECCS valve in the event of a reactor accident.

In addition, an embodiment of the present invention may reduce a safety level of a reactor vessel by configuring the ECCS valve and the existing isolation valve, thereby designing the reduced safety level of a small containment vessel according to the design characteristics of the reactor.

Although the embodiments of the present invention have been described in detail above, the scope of the present invention is not limited thereto, and various modifications and improvements made by those of ordinary skill in the field to which the present invention pertains also belong to the scope of the present invention.

INDUSTRIAL APPLICABILITY

An embodiment of the present invention may easily implement an ECCS valve function by using a simple valve for preventing malfunction and the existing isolation valve (fail-open).

In addition, an embodiment of the present invention may greatly reduce a possibility of exposure of a core by preventing malfunction of the ECCS valve in the event of a reactor accident.

In addition, an embodiment of the present invention may reduce a safety level of a reactor vessel by configuring the ECCS valve and the existing isolation valve, thereby designing the reduced safety level of a small containment vessel according to the design characteristics of the reactor.

The invention claimed is:

1. A system comprising:
an emergency core cooling system (ECCS) valve;
a nuclear reactor vessel; and
a containment vessel surrounding the nuclear reactor vessel,
wherein the ECCS valve is provided between
the nuclear reactor vessel
and the containment vessel,
and the ECCS valve is configured to supply
a coolant, that is filled in a containment space formed between the nuclear reactor vessel and the containment vessel,
to the nuclear reactor vessel
in the event of a loss of coolant accident (LOCA), and
wherein the ECCS valve comprises:
an outer shell
connected to the nuclear reactor vessel
and protruding toward the containment vessel
and having a connector formed therein
so as to communicatively connect an interior of the nuclear reactor vessel to the containment space;
an inner shell provided inside the outer shell
at a preset distance from an inner wall of the outer shell;

a piston movably constrained and inserted through a piston opening formed in the inner shell at a position facing the connector of the outer shell to open and close the connector;

a spring provided on an outer circumferential surface of the piston to provide a restoring force for moving the piston in a direction toward the nuclear reactor vessel, a fluid pump configured to supply fluid to an inside of the inner shell between the nuclear reactor vessel and a bottom portion of the piston;

a swing check valve provided to pivotally hinge on an inner wall of the inner shell on the side of the nuclear reactor vessel and opening and closing an inner shell opening between the nuclear reactor vessel and the inner shell according to an internal pressure of the nuclear reactor vessel and a fluid pressure supplied from the fluid pump into the inner shell;

a reset valve connected to the fluid pump and supplying, by opening, a fluid from the fluid pump to the inside of the inner shell between the nuclear reactor vessel and the bottom portion of the piston; and a trip valve opened during malfunction of the reset valve or by an operating signal and operating to reduce an internal pressure of the inner shell, wherein the piston operates to open the connector when a difference between an internal pressure of the nuclear reactor vessel and an internal pressure of the containment vessel is less than the restoring force of the spring, wherein the inner shell shares an inner wall with the outer shell.

2. The system of claim 1, wherein:

the piston includes a body portion inserted into the piston opening of the inner cell;

a head portion integrally formed with the body portion on one side of the body portion and contacting the connector; and a bottom portion integrally formed with the body portion on the other side of the body portion and provided inside the inner shell.

3. The system of claim 2, wherein:

the spring is interposed between an inner wall of the inner shell and the bottom portion of the piston inside the inner shell.

4. The system of claim 2, wherein:

the piston opening is sealed by inserting the body portion of the piston thereinto.

5. The system of claim 2, wherein:

the head portion includes an inclined surface inclined toward the connector on a cross section, and the inclined surface contacts an edge of the connector so that the head portion seals the connector.

6. The system of claim 5, wherein:

the outer shell has a protruding shape directed toward the containment vessel in a form corresponding to the inclined surface of the head portion.

7. The system of claim 2, wherein:

the head portion includes a stepped surface stepped toward the connector, and the stepped surface contacts an edge of the connector so that the head portion seals the connector.

8. The system of claim 2, wherein:

the head portion includes a stepped surface, and the spring is interposed between the stepped surface of the head portion and an inner wall of the outer shell.

9. The system of claim 1, further comprising:

an isolation valve connected to the outer shell to be communicatively connected to the connector and configured to be opened by an operation signal in the event of the LOCA.

* * * * *